United States Patent [19]

Alaze

[11] Patent Number: 5,031,664

[45] Date of Patent: Jul. 16, 1991

[54] PRESSURE FLUID RESERVOIR FOR VEHICLE BRAKE SYSTEMS

[75] Inventor: Norbert Alaze, Markgroeningen, Fed. Rep. of Germany

[73] Assignee: Robert Bosch GmbH, Stuttgart, Fed. Rep. of Germany

[21] Appl. No.: 483,848

[22] Filed: Feb. 23, 1990

[30] Foreign Application Priority Data

Jun. 1, 1989 [DE] Fed. Rep. of Germany ....... 3917797

[51] Int. Cl.[5] ........................ F16L 55/04; F01B 31/00

[52] U.S. Cl. ........................................ 138/31; 138/26; 92/181 R; 92/181 P

[58] Field of Search ...................... 138/31, 26; 92/172, 92/181 R, 181 P; 60/413; 417/540

[56] References Cited

U.S. PATENT DOCUMENTS

| | | | |
|---|---|---|---|
| 1,959,640 | 5/1934 | Peters | 138/31 |
| 2,930,360 | 3/1960 | Yando | 92/172 |
| 4,043,352 | 8/1977 | Simpson | 138/31 |
| 4,685,491 | 8/1987 | Fulmer et al. | 138/31 |

*Primary Examiner*—David T. Fidei
*Assistant Examiner*—M. D. Patterson
*Attorney, Agent, or Firm*—Edwin E. Greigg; Ronald E. Greigg

[57] ABSTRACT

A pressure fluid reservoir having at least an approximately vertically disposed cylinder with a displaceably guided divider piston therein. The piston divides a pressure fluid reservoir chamber of the cylinder, located below the piston from a gas chamber located above the piston. The divider piston has a hollow chamber, which is covered with respect to the gas chamber by a cap having an opening. The cap has a fluid seal for lubricating piston sealing rings. A riser pipe that begins at an opening in the cap extends as far as a bottom of the hollow chamber that contains fluid. In an expansion of a gas cushion located in the gas chamber in the riser pipe and in the hollow chamber, fluid is pumped through the riser pipe to the fluid seal, to regenerate it the fluid seal. The pressure fluid reservoir is particularly well suited to vehicle brake systems, where long functional reliability of a piston seal is crucial.

5 Claims, 1 Drawing Sheet

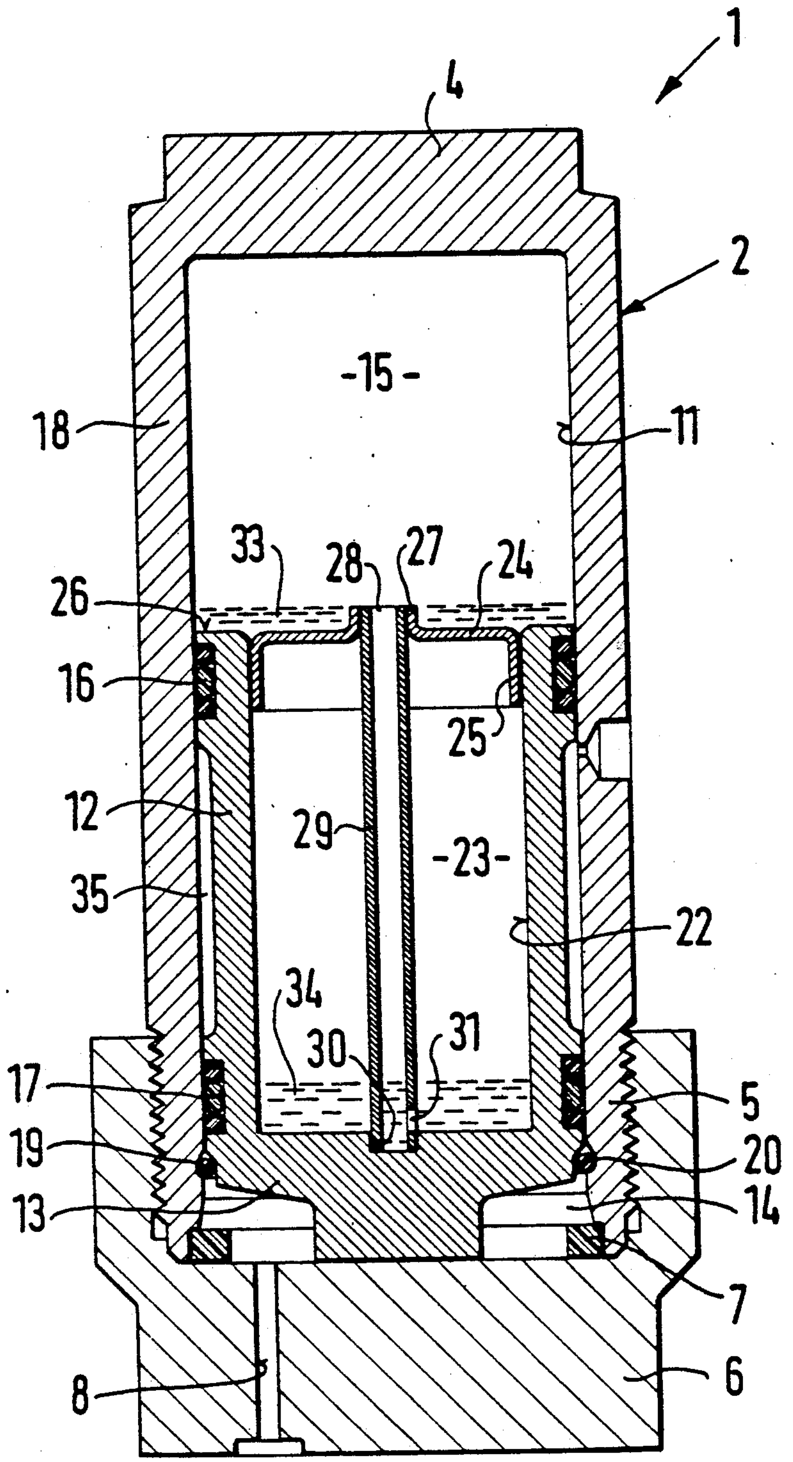
1
4
2
-15-
18
11
33
28
27
24
26
16
25
12
29
-23-
35
22
34
30
31
17
5
19
20
13
14
7
8
6

PRESSURE FLUID RESERVOIR FOR VEHICLE BRAKE SYSTEMS

BACKGROUND OF THE INVENTION

The invention is based on a pressure fluid reservoir as defined hereinafter. In a known reservoir of this kind disclosed in U.S. Pat. No. 4,685,491, the cap of the divider piston has a tubular extension that protrudes above the level of the fluid seal. First, this provides communication between the gas chamber located above the piston and the hollow chamber in the piston; second, it is intended to prevent the fluid from draining into the hollow chamber. However, such drainage is not entirely precluded, because if the pressure fluid reservoir, installed in a motor vehicle, for instance, is severely jarred, the fluid can get into the extension and thus flow into the hollow chamber of the piston, and so this portion of the fluid can no longer contribute to lubricating the piston seals or to sealing off the gas chamber.

OBJECT AND SUMMARY OF THE INVENTION

The pressure fluid reservoir according to the invention has an advantage over the prior art such that if the gas in both the hollow chamber and the gas chamber is expanded by withdrawing pressure fluid from the pressure fluid reservoir chamber of the cylinder, fluid present in the hollow chamber is pumped through the riser pipe to supplement the fluid seal. The fluid seal can therefore maintain its function even under extreme operating conditions. Moreover, the fluid reserve in the pressure fluid reservoir can be increased compared with the known embodiment, and the fluid seal can be supplied over a long period of time from this reserve located in the hollow chamber. The duration of functional capacity of the fluid seal is thus considerably longer.

The invention will be better understood and further objects and advantages thereof will become more apparent from the ensuing detailed description of a preferred embodiment taken in conjunction with the drawing.

BRIEF DESCRIPTION OF THE DRAWINGS

The sole figure shows in simplified form an exemplary embodiment of a pressure fluid reservoir in longitudinal section.

DESCRIPTION OF THE PREFERRED EMBODIMENTS

The pressure fluid reservoir 1 shown in the drawing has a cylinder 2 disposed with a vertical axis. The cylinder 2 has an end wall 4 on its upper end. This wall is provided with a filling valve, not shown. The cylinder 2 is threaded into a lower part 6 of the reservoir with its opposite, lower end 5. A sealing ring 7 introduced between the cylinder 2 and the lower part 6 of the reservoir hermetically seals off the cylinder from the lower part of the reservoir. The lower part 6 is provided with a bore 8 which discharges into the cylinder 2, and this bore communicates with a source of pressure fluid, such as a vehicle brake system, in a manner not shown.

A longitudinally displaceably guided divider piston 12 is located in the bore 11 of the cylinder 2. This piston divides a pressure fluid reservoir chamber 14 of the cylinder 2, located below the piston bottom 13, from a gas chamber 15 of the cylinder, located above the piston 12. The divider piston 12 is sealed off from the cylinder wall 18 by two spaced apart piston sealing rings 16, 17. The divider piston is also secured against falling out of the cylinder 2 if the lower part 6 of the reservoir is missing by means of a securing ring 20 placed in a groove 19 of the cylinder wall 18.

The divider piston 12 has a hollow chamber 23, embodied by a longitudinal bore 22 and covered with respect to the gas chamber 15 by a cap 24. The cap 24 is pressed by one edge 25 into the longitudinal bore 22, and extends substantially in the plane of the face end 26 of the piston toward the gas chamber. The cap 24 is also provided with a tubular extension 27 oriented toward the gas chamber 15 and defining a raised opening 28 at the top of the cap 24. A riser pipe 29 begins at the opening 28 of the cap 24 and extends as far as the bottom of the hollow chamber 23. This pipe is secured at one end to the tubular extension 27 of the cap 24 and on the other it engages a blind bore 30 of the divider piston bottom 13. Directly above the bottom 13 of the divider piston 12, the riser pipe 29 has an opening 31. Accordingly, a flow connection is provided between the gas chamber 15 located above the divider piston 12 and the hollow chamber 23 of the divider piston, by means of the opening 28 of the cap 24, the interior of the riser pipe 29, and the opening 31 of the riser pipe.

There is a fluid seal 33, the level of which is determined by the height of the extension 27 of the cap 24, in the vicinity of the face end 26 of the piston. The fluid serves to lubricate the piston sealing ring 16. It also prevents the escape of compressed gas, which is located at high pressure in the gas chamber 15, the riser pipe 29 and the hollow chamber 23 of the divider piston 12. The hollow chamber 23 of the divider piston 12 also contains a certain amount of this fluid 34. The fluid is equivalent in chemical composition to the pressure fluid fed into the pressure fluid reservoir chamber 14, because due to the lubrication process, some of the fluid can get into the intervening space 35 and reach the seal 17 over the service life of the pressure fluid reservoir 1. This reduces the amount of fluid in the fluid seal 33; but it does no harm, because the fluid seal is regenerated, as described below:

The compressed gas located in the gas chamber 15, the riser pipe 29, and the hollow chamber 23 of the divider piston 12 forms a gas cushion, which has the effect of moving the divider piston downward in the cylinder 2 until it strikes the lower part 6 of the reservoir. Pressure fluid that flows through the bore 8 in the lower part 6 into the reservoir chamber 14 presses the divider piston 12 toward the end wall 4 of the cylinder 2, counter to the action of the gas cushion. The result is an increased compression of the compressed gas in the gas chamber 15, riser pipe 29 and hollow chamber 23. When pressure fluid is withdrawn from the pressure fluid reservoir chamber 14, the divider piston 12 is contrarily displaced downward, and the compressed gas is partly expanded. The expanding gas located in the hollow chamber 23 of the divider piston 12 then presses the fluid 34 located above the opening 31 of the riser pipe 29 through the riser pipe into the gas chamber 15. There the fluid spreads out and fills the fluid seal 33. The excess fluid is pumped through the opening 28 and riser pipe 29 back into the hollow chamber 23 of the divider piston 12.

In a modification of the above-described exemplary embodiment, the cap 24 may also be conical in shape toward the end wall 4 of the cylinder 2, in order to provide the opening 28 that is raised relative to the face end of the piston. In that case, the tubular extension 27 for fixation of the riser pipe 29 is oriented toward the bottom 13 of the divider piston 12. The riser pipe 29 and cap 24 could also be made in one piece from plastic. The riser pipe 29 can also be located eccentrically in the divider piston 12. As a result of the pumping process occurring each time the gas cushion expands, the fluid seal 33 can be embodied with a very small capacity. It is even entirely sufficient for the divider piston 12 to be provided with merely a chamfer toward the cylinder wall, in the vicinity of the face end 26 of the piston, and the chamfer then receives the fluid seal.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A pressure fluid reservoir (1), for vehicle brake systems, having at least an approximately vertically disposed cylinder (2) with one open end, said cylinder is provided with a divider piston (12) that is displaceably guided in the cylinder, said divider piston divides a pressure fluid reservoir chamber (14) of the cylinder, located below the piston, from a gas chamber (15) of the cylinder, located above the piston, said divider piston includes a face end (26) and a hollow chamber (23), a cap (24) that covers said hollow chamber, said cap (24) is provided with a raised opening (28) and is provided with a fluid seal (33) covering the face end (26) of the piston at least toward a cylinder wall for lubrication of piston sealing rings (16, 17), which surround said divider piston (12), a riser pipe (29) extends from said raised opening (28) nearly to a bottom wall of the hollow chamber (23) which contains a fluid (34) therein, and a flow connection is provided between the hollow chamber (23) and an interior of the riser pipe (29).

2. A pressure fluid reservoir as defined by claim 1, in which said riser pipe (29) which extends to the bottom of said divider piston fits into a blind bore in the bottom (13) of said divider piston near the reservoir chamber (14) of the divider piston (12), and said riser pipe is provided with an opening (31) located near the bottom (13) of the divider piston.

3. A pressure fluid reservoir as defined by claim 1, in which said riser pipe (29) is secured in a tubular extension (27) of the cap (24).

4. A pressure fluid reservoir as defined by claim 3, in which said riser pipe (29) and the cap (24) are formed in one piece.

5. A pressure fluid reservoir as defined by claim 4, wherein said one piece riser pipe and cap are made of plastic.

* * * * *